(12) United States Patent
Gonion

(10) Patent No.: US 9,311,094 B2
(45) Date of Patent: Apr. 12, 2016

(54) PREDICTING A PATTERN IN ADDRESSES FOR A MEMORY-ACCESSING INSTRUCTION WHEN PROCESSING VECTOR INSTRUCTIONS

(75) Inventor: Jeffry E. Gonion, Campbell, CA (US)

(73) Assignee: Apple Inc., Cupertino, CA (US)

( * ) Notice: Subject to any disclaimer, the term of this patent is extended or adjusted under 35 U.S.C. 154(b) by 1074 days.

(21) Appl. No.: 13/090,131

(22) Filed: Apr. 19, 2011

(65) Prior Publication Data

US 2012/0191944 A1   Jul. 26, 2012

Related U.S. Application Data

(60) Provisional application No. 61/435,175, filed on Jan. 21, 2011.

(51) Int. Cl.
*G06F 15/00* (2006.01)
*G06F 15/76* (2006.01)
*G06F 9/30* (2006.01)
*G06F 9/345* (2006.01)
*G06F 9/38* (2006.01)

(52) U.S. Cl.
CPC .......... *G06F 9/30181* (2013.01); *G06F 9/3004* (2013.01); *G06F 9/30018* (2013.01); *G06F 9/30036* (2013.01); *G06F 9/30043* (2013.01); *G06F 9/30072* (2013.01); *G06F 9/3455* (2013.01); *G06F 9/3832* (2013.01)

(58) Field of Classification Search
None
See application file for complete search history.

(56) References Cited

U.S. PATENT DOCUMENTS

| | | | | |
|---|---|---|---|---|
| 5,179,674 A | * | 1/1993 | Williams | G06F 12/10 711/204 |
| 5,761,706 A | * | 6/1998 | Kessler | G06F 12/0862 711/118 |
| 5,895,501 A | * | 4/1999 | Smith | 711/207 |
| 8,209,525 B2 | | 6/2012 | Gonion et al. | |
| 8,862,932 B2 | | 10/2014 | Gonion | |
| 9,009,528 B2 | | 4/2015 | Gonion | |
| 2007/0143575 A1 | * | 6/2007 | Jourdan et al. | 712/2 |
| 2009/0328047 A1 | * | 12/2009 | Li | G06F 9/5033 718/102 |

OTHER PUBLICATIONS

Mathew (Design of a Parallel Vector Access Unit for SDRAM Memory Systems, Jan. 2000, pp. 1-10).*

* cited by examiner

*Primary Examiner* — George Giroux
(74) *Attorney, Agent, or Firm* — Meyertons, Hood, Kivlin, Kowert & Goetzel, P.C.; Lawrence J. Merkel

(57) ABSTRACT

The described embodiments provide a processor that executes a vector instruction. In the described embodiments, while executing instructions, the processor encounters a vector memory-accessing instruction that performs a memory operation for a set of elements in the memory-accessing instruction. In these embodiments, if an optional predicate vector is received, for each element in the memory-accessing instruction for which a corresponding element of the predicate vector is active, otherwise, for each element in the memory-accessing instruction, upon determining that addresses in the elements are likely to be arranged in a predetermined pattern, the processor predicts that the addresses in the elements are arranged in the predetermined pattern. The processor then performs a fast version of the memory operation corresponding to the predetermined pattern.

25 Claims, 3 Drawing Sheets

PREDICTING A PATTERN IN ADDRESSES FOR A MEMORY-ACCESSING INSTRUCTION WHEN PROCESSING VECTOR INSTRUCTIONS

RELATED APPLICATIONS

This application is a non-provisional application from, and hereby claims priority under 35 U.S.C. §120 to, U.S. provisional patent application 61/435,175, entitled "Predicting a Pattern in Addresses for a Memory-Accessing Instruction when Processing Vector Instructions," by inventor Jeffry E. Gonion, filed on 21 Jan. 2011.

This application is related to: (1) pending application Ser. No. 12/419,629, entitled "Method and Apparatus for Executing Program Code," by inventors Jeffry E. Gonion and Keith E. Diefendorff, filed on 7 Apr. 2009; (2) pending application Ser. No. 12/419,644, entitled "Break, Pre-Break, and Remaining Instructions for Processing Vectors," by inventors Jeffry E. Gonion and Keith E. Diefendorff, filed on 7 Apr. 2009; (3) pending application Ser. No. 12/419,661, entitled "Check-Hazard Instructions for Processing Vectors," by inventors Jeffry E. Gonion and Keith E. Diefendorff, filed on 7 Apr. 2009; (4) pending application Ser. No. 12/495,656, entitled "Copy-Propagate, Propagate-Post, and Propagate-Prior Instructions For Processing Vectors," by inventors Jeffry E. Gonion and Keith E. Diefendorff, filed on 30 Jun. 2009; (5) pending application Ser. No. 12/495,643, entitled "Shift-In-Right Instructions for Processing Vectors," by inventors Jeffry E. Gonion and Keith E. Diefendorff, filed on 30 Jun. 2009; (6) pending application Ser. No. 12/495,631, entitled "Increment-Propagate and Decrement-Propagate Instructions for Processing Vectors," by inventors Jeffry E. Gonion and Keith E. Diefendorff, filed on 30 Jun. 2009; (7) pending application Ser. No. 12/541,505, entitled "Running-Sum Instructions for Processing Vectors," by inventors Jeffry E. Gonion and Keith E. Diefendorff, filed on 14 Aug. 2009; (8) pending application Ser. No. 12/541,526, entitled "Running-AND, Running-OR, Running-XOR, and Running-Multiply Instructions for Processing Vectors" by inventors Jeffry E. Gonion and Keith E. Diefendorff, filed on 14 Aug. 2009; and (9) pending application Ser. No. 12/541,546, entitled "Running-Shift Instructions for Processing Vectors," by inventors Jeffry E. Gonion and Keith E. Diefendorff, filed 14 Aug. 2009.

This application is also related to: (1) pending application Ser. No. 12/873,043, entitled "Running-Min and Running-Max Instructions for Processing Vectors," by inventors Jeffry E. Gonion and Keith E. Diefendorff, filed 31 Aug. 2010; (2) pending application Ser. No. 12/873,063, entitled "Non-Faulting and First-Faulting Instructions for Processing Vectors," by inventors Jeffry E. Gonion and Keith E. Diefendorff, filed 31 Aug. 2010; (3) pending application Ser. No. 12/873,074, entitled "Vector Test Instruction for Processing Vectors" by inventors Jeffry E. Gonion and Keith E. Diefendorff, filed 31 Aug. 2010; (4) pending application Ser. No. 12/907,471, entitled "Select First and Select Last Instructions for Processing Vectors," by inventors Jeffry E. Gonion and Keith E. Diefendorff, filed 19 Oct. 2010; (5) pending application Ser. No. 12/907,490, entitled "Actual Instruction and Actual-Fault Instructions for Processing Vectors," by inventors Jeffry E. Gonion and Keith E. Diefendorff, filed 19 Oct. 2010; (6) pending application Ser. No. 12/977,333, entitled "Remaining Instruction for Processing Vectors," by inventors Jeffry E. Gonion and Keith E. Diefendorff, filed 23 Dec. 2010; and (7) pending application Ser. No. 13/006,243, entitled "Generate Predictes Instruction for Processing Vectors," by inventors Jeffry E. Gonion and Keith E. Diefendorff, filed 13 Jan. 2011.

This application is also related to: (1) pending application Ser. No. 12/237,212, entitled "Conditional Data-Dependency Resolution in Vector Processors," by inventors Jeffry E. Gonion and Keith E. Diefendorff, filed 24 Sep. 2008; (2) pending application Ser. No. 12/237,196, entitled "Generating Stop Indicators Based on Conditional Data Dependency in Vector Processors," by inventors Jeffry E. Gonion and Keith E. Diefendorff, filed 24 Sep. 2008; and (3) pending application Ser. No. 12/237,190, entitled "Generating Predicate Values Based on Conditional Data Dependency in Vector Processors," by inventors Jeffry E. Gonion and Keith E. Diefendorff, filed 24 Sep. 2008.

BACKGROUND

1. Field

The described embodiments relate to techniques for improving the performance of computer systems. More specifically, the described embodiments relate to predicting a pattern in addresses for a memory-accessing instruction when processing vector instructions.

2. Related Art

Recent advances in processor design have led to the development of a number of different processor architectures. For example, processor designers have created superscalar processors that exploit instruction-level parallelism (ILP), multi-core processors that exploit thread-level parallelism (TLP), and vector processors that exploit data-level parallelism (DLP). Each of these processor architectures has unique advantages and disadvantages which have either encouraged or hampered the widespread adoption of the architecture. For example, because ILP processors can often operate on existing program code that has undergone only minor modifications, these processors have achieved widespread adoption. However, TLP and DLP processors typically require applications to be manually re-coded to gain the benefit of the parallelism that they offer, a process that requires extensive effort. Consequently, TLP and DLP processors have not gained widespread adoption for general-purpose applications.

One significant issue affecting the adoption of DLP processors is the vectorization of loops in program code. In a typical program, a large portion of execution time is spent in loops. Unfortunately, many of these loops have characteristics that render them unvectorizable in existing DLP processors. Thus, the performance benefits gained from attempting to vectorize program code can be limited.

One significant obstacle to vectorizing loops in program code in existing systems is dependencies between iterations of the loop. For example, loop-carried data dependencies and memory-address aliasing are two such dependencies. These dependencies can be identified by a compiler during the compiler's static analysis of program code, but they cannot be completely resolved until runtime data is available. Thus, because the compiler cannot conclusively determine that runtime dependencies will not be encountered, the compiler cannot vectorize the loop. Hence, because existing systems require that the compiler determine the extent of available parallelism during compilation, relatively little code can be vectorized.

SUMMARY

The described embodiments provide a processor that executes a vector instruction. In the described embodiments, while executing instructions, the processor encounters a vector memory-accessing instruction that performs a memory operation for a set of elements in the memory-accessing instruction. In these embodiments, if an optional predicate vector is received, for each element in the memory-accessing instruction for which a corresponding element of the predicate vector is active, otherwise, for each element in the memory-accessing instruction, upon determining that addresses in the elements are likely to be arranged in a predetermined pattern, the processor predicts that the addresses in the elements are arranged in the predetermined pattern. The processor then performs a fast version of the memory operation corresponding to the predetermined pattern.

In the described embodiments, the addresses in the elements are arranged in the predetermined pattern when the addresses are one of: (1) the same address; (2) sequential addresses; (3) addresses in a same cache line; (4) addresses in a same page of memory; or (5) addresses belonging to two or more different cache banks that can be accessed in parallel.

In the described embodiments, when performing the fast version of the memory operation, the processor generates a fast version of the memory operation corresponding to the predetermined pattern, wherein the fast version of the memory operation includes a reduced number of sub-operations (in comparison to the normal version of the memory operation) or sub-operations that can be executed more quickly than the sub-operations in a normal version of the memory operation. The processor then executes the fast version of the memory operation.

In the described embodiments, if the predicate vector is received, for each element in the memory-accessing instruction for which a corresponding element of the predicate vector is active, otherwise, for each element in the memory-accessing instruction, when generating the fast version of the memory operation, the processor is configured to determine at least one physical address for an address in at least one specified element of the memory-accessing instruction, wherein the at least one specified element is determined according to the predetermined pattern. The processor then determines at least one of a size or location at least one portion of memory to be accessed based on the predetermined pattern. Next, the processor generates at least one memory operation to access the at least one portion of memory using the at least one physical address.

In the described embodiments, the portion of memory comprises at least one cache line.

In the described embodiments, if the predicate vector is received, for each element in the memory-accessing instruction for which a corresponding element of the predicate vector is active, otherwise, for each element in the memory-accessing instruction, when generating the fast version of the memory operation, the processor is configured to determine a physical address for an address in a specified element of the memory-accessing instruction, wherein the specified element is determined according to the predetermined pattern, and wherein determining the physical address comprises determining a page of memory in which the address is located. The processor then generates at least one memory operation to access a page of memory using the at least one physical address.

In the described embodiments, upon determining that addresses in the elements are not likely to be arranged in a predetermined pattern, the processor performs a normal version of the memory operation.

In the described embodiments, when performing the normal version of the memory operation, if the predicate vector is received, for each element in the memory-accessing instruction for which a corresponding element of the predicate vector is active, otherwise, for each element in the memory-accessing instruction, the processor determines a physical address for the element of the memory-accessing instruction. The processor then accesses memory using the corresponding physical address for the element of the memory-accessing instruction.

In the described embodiments, the memory operation is one of a load operation or a store operation.

In the described embodiments, if the predicate vector is received, for each element in the memory-accessing instruction for which a corresponding element of the predicate vector is active, otherwise, for each element in the memory-accessing instruction, the processor determines an actual address for each element of the memory-accessing instruction. The processor then determines if the actual addresses conform to the predicted predetermined pattern of addresses. If the actual addresses do not conform to the predicted predetermined pattern of addresses the processor performs a remedial action. Otherwise, if the actual addresses conform to the predicted predetermined pattern of addresses, the processor continues subsequent execution.

In the described embodiments, the processor uses one or more factors to determine if the addresses in the elements are likely to be arranged in the predetermined pattern.

In the described embodiments, the memory-accessing instruction is a VectorRead instruction, a VectorReadFF instruction, a VectorReadNF instruction, or a VectorWrite instruction.

BRIEF DESCRIPTION OF THE FIGURES

In the figures, like reference numerals refer to the same figure elements.

DETAILED DESCRIPTION

Figure 1:
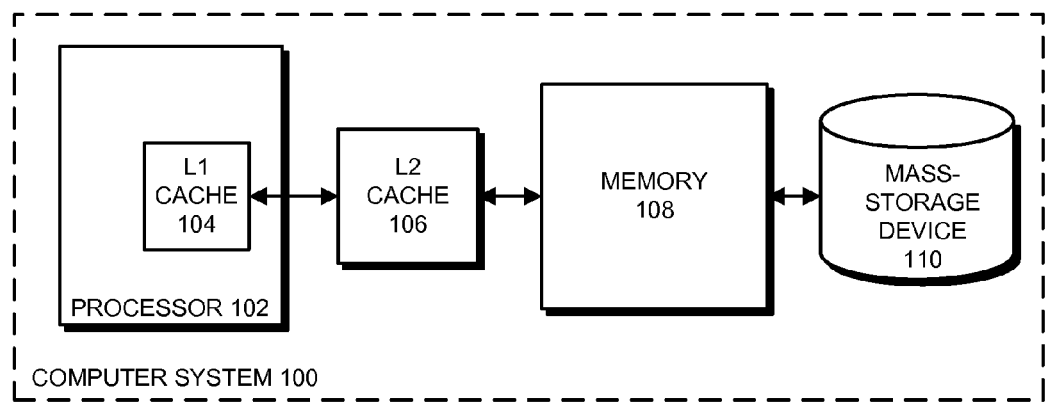
FIG. 1 presents a block diagram of a computer system in accordance with the described embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system.

The computer-readable storage medium includes, but is not limited to, volatile memory and non-volatile memory, such as magnetic and optical storage devices such as disk drives, magnetic tape, CDs (compact discs), DVDs (digital versatile discs or digital video discs), or other media capable of storing data structures or code.

The methods and processes described in this detailed description can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules. In some embodiments, the hardware modules include one or more general-purpose circuits that are configured by executing instructions to perform the methods and processes.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Macroscalar Architecture

The embodiments described herein are based in part on the Macroscalar Architecture that is described in U.S. patent application Ser. No. 12/977,333, entitled "Generate Predicates Instruction for Processing Vectors," by inventors Jeffry E. Gonion and Keith Diefendorff, filed on 23 Dec. 2010 (hereinafter "the '333 application"), the contents of which are incorporated by reference.

As described in the '333 application, the described embodiments provide an instruction set and supporting hardware that allow compilers to generate program code for loops without completely determining parallelism at compile-time, and without discarding useful static analysis information. Specifically, these embodiments provide a set of instructions that do not mandate parallelism for loops but instead enable parallelism to be exploited at runtime if dynamic conditions permit. These embodiments thus include instructions that enable code generated by the compiler to dynamically switch between non-parallel (scalar) and parallel (vector) execution for loop iterations depending on conditions at runtime by switching the amount of parallelism used.

These embodiments provide instructions that enable an undetermined amount of vector parallelism for loop iterations but do not require that the parallelism be used at runtime. More specifically, these embodiments include a set of vector-length agnostic instructions whose effective vector length can vary depending on runtime conditions. Thus, if runtime dependencies demand non-parallel execution of the code, then execution occurs with an effective vector length of one element. Likewise, if runtime conditions permit parallel execution, the same code executes in a vector-parallel manner to whatever degree is allowed by runtime dependencies (and the vector length of the underlying hardware). For example, if two out of eight elements of the vector can safely execute in parallel, the described embodiments execute the two elements in parallel. In these embodiments, expressing program code in a vector-length agnostic format enables a broad range of vectorization opportunities that are not present in existing systems.

In the described embodiments, during compilation, a compiler first analyzes the loop structure of a given loop in program code and performs static dependency analysis. The compiler then generates program code that retains static analysis information and instructs processor 102 how to resolve runtime dependencies and process the program code with the maximum amount of parallelism possible. More specifically, the compiler provides vector instructions for performing corresponding sets of loop iterations in parallel, and provides vector-control instructions for dynamically limiting the execution of the vector instructions to prevent data dependencies between the iterations of the loop from causing an error (which can be called "vector partitioning"). This approach defers the determination of parallelism to runtime, where the information on runtime dependencies is available, thereby allowing the software and processor to adapt parallelism to dynamically changing conditions.

Terminology

Throughout the description, we use the following terminology. These terms may be generally known in the art, but are described below to clarify the subsequent descriptions.

The term "active element," as used in this description to refer to one or more elements of a vector, indicates elements that are operated on during a given operation. Generally, the described embodiments enable a vector execution unit to selectively perform parallel operations on one or more available elements in a given vector in parallel. For example, an operation can be performed on only the first two of eight elements of the vector in parallel. In this case, the first two elements are "active elements," while the remaining six elements are "inactive elements." In the described embodiments, one or more other vectors can be used to determine which elements in a given operand vector are active (i.e., are to be operated on). For example, a "predicate vector" can include "active" elements that are used to determine which elements in the operand vector to perform operations on. In some embodiments, elements that contain data of a predetermined type are active elements (e.g., true, false, non-zero, zero, uppercase/lowercase characters, even/odd/prime numbers, vowels, whole numbers, etc.).

The terms "true" and "false" are used in this description to refer to data values (e.g., a data value contained in an element in a vector). Generally, in computer systems true and false are often represented by 1 and 0, respectively. In practice, a given embodiment could use any value to represent true and false, such as the number 55, or the letter "T."

Notation

In describing the embodiments in the instant application, we use the following formats for variables, which are vector quantities unless otherwise noted:

p5=a<b;

Elements of vector p5 are set to 0 or 1 depending on the result of the comparison operation a<b. Note that vector p5 can be a predicate vector that can be used to control the number of elements of one or more vector instructions that execute in parallel.

p5; a=b+c;

Only elements in vector a designated by active (i.e., non-zero) elements in the predicate vector p5 receive the result of b+c. The remaining elements of a are unchanged. This operation is called "predication," and is denoted using the tilde ("~") before the predicate vector.

~p5; a=b+c;

Only elements in vector a designated by active (i.e., non-zero) elements in the predicate vector p5 receive the result of b+c. The remaining elements of a are set to zero. This operation is called "zeroing," and is denoted using the exclamation point ("!") before the predicate vector.

if (FIRST( )) goto ...; Also LAST( ), ANY( ), ALL( ), CARRY( ),
ABOVE( ), or NONE( ), (where ANY( ) == !NONE( ))

These instructions test the processor status flags and branch accordingly.

x+=VECLEN;

VECLEN is a value that communicates the number of elements per vector. The value is determined at runtime by the processor 102 (see FIG. 1), rather than being determined by the compiler/assembler.

// Comment

In a similar way to many common programming languages, the examples presented below use the double forward slash to indicate comments. These comments can provide information regarding the values contained in the indicated vector or explanation of operations being performed in a corresponding example.

In these examples, other C++-formatted operators retain their conventional meanings, but are applied across the vector on an element-by-element basis. Where function calls are employed, they imply a single instruction that places any value returned into a destination register. For simplicity in understanding, all vectors discussed herein are vectors of integers, but alternative embodiments support other data formats.

Instruction Definitions

The described embodiments include numerous instructions that can be used to perform memory accesses. For example, the VectorRead, VectorReadFF, VectorReadNF, and VectorWrite instructions can be used to perform memory accesses. This section provides a brief description of the VectorRead, VectorReadFF, VectorReadNF, and VectorWrite instructions to enable a clearer understanding of the described embodiments.

Although we provide brief descriptions of the VectorRead, VectorReadFF, VectorReadNF, and VectorWrite instructions, the '333 application includes more detail about these instructions' operations and interactions with other instructions and operations. In addition, although we describe the VectorRead, VectorReadFF, VectorReadNF, and VectorWrite instructions as examples, the prediction operation in the described embodiments can be performed for other vector memory-accessing instructions. Moreover, although we describe the VectorRead, VectorReadFF, VectorReadNF, and VectorWrite instructions in a particular way, a person of skill in the art will recognize that these concepts may be implemented using different arrangements or types of instructions without departing from the spirit of the described embodiments.

As can be seen from the definition below, in some embodiments, the vector read and write instructions include a further specification of the data type upon which the instructions operate. For example, in some embodiments, the instruction is specified as VectorReadIntFF or VectorReadIntNF when reading integer data. However, for clarity, in this description, the VectorReadFF and VectorReadNF instructions are described generally, i.e., with no data type specified.

Note that the format of the following instruction definitions is a statement of the instruction type followed by a description of the instruction that can include example code as well as one or more usage examples.

VectorRead

This instruction reads a vector of data from a vector of addresses calculated from the instruction's inputs. A vector of offsets in offset are scaled by 1, 2, 4, or 8 according to type, and added to the scalar address specified in ptr. Data is returned in the destination register, and either sign-extended or zero-padded depending on whether signed or unsigned data is loaded. If this instruction is predicated, only addresses corresponding to active elements are read. This instruction faults on any attempt to read an unmapped page. Depending on the setting of the STM bit, the operating system may choose to set bits in the FSR in response to illegal memory operations in other than the first active element. The syntax for this instruction is:

Vector VectorRead<type>(void*ptr,Vector offset);

VectorReadFF

This instruction reads a vector of data from a vector of addresses calculated from its inputs. Only the first active element can generate a memory fault or exception. A vector of offsets in offset are scaled by 1, 2, 4, or 8, according to type, and added to the scalar address specified in ptr. Data is returned in the destination register. If this instruction is predicated, only addresses corresponding to active elements are read.

This instruction only takes a page fault if the first active address is illegal or otherwise unmapped. If a faulting condition occurs in positions subsequent to the first active element, no exception is generated and corresponding bits in the FSR are set. This allows subsequent elements to avoid paging-in data from mass storage when the data is not certain to be used.

The interface for this instruction is:

Vector VectorRead<type>*FF*(void*ptr,Vector offset);

VectorReadNF

This instruction reads a vector of data from a vector of addresses calculated from its inputs. This instruction does not generate any memory faults, and thus may not actually read memory if a fault should have occurred. A vector of offsets in offset are scaled by 1, 2, 4, or 8, according to type, and added to the scalar address specified in ptr. Data is returned in the destination register. If this instruction is predicated, only addresses corresponding to active elements are read.

This instruction does not fault if an address is illegal or otherwise unmapped. If a faulting condition occurs, no exception is generated and corresponding bits in the FSR are set. This provides a mechanism for software speculation to avoid paging-in data from mass storage when the data is not certain to be used. This instruction is useful when speculatively pointer chasing, and to prefetch data that may not be accessed.

The interface for this instruction is:

Vector VectorRead<type>*NF*(void*ptr,Vector offset);

Flags: NONE: Set if no elements read; cleared otherwise.

VectorWrite

This instruction writes a vector of data in values to a vector of addresses calculated from the instruction's inputs. A vector of offsets in offset are scaled by 1, 2, 4, or 8 according to type, and added to the scalar address specified in pr. If this instruction is predicated, only addresses corresponding to active elements are written. Write addresses should be valid, and there is no avoidance of program termination in the event of a write to an illegal or protected address. The syntax for this instruction is:

Vector VectorWrite<type>(void*ptr,Vector offset,
  Vector values);

Computer System

FIG. 1 presents a block diagram of a computer system 100 in accordance with the described embodiments. Computer system 100 includes processor 102, L2 cache 106, memory 108, and mass-storage device 110. Processor 102 includes L1 cache 104.

Processor 102 can be a general-purpose processor that performs computational operations. For example, processor 102 can be a central processing unit (CPU) such as a microprocessor, a controller, an application-specific integrated circuit (ASIC), or a field-programmable gate array (FPGA). In the described embodiments, processor 102 has one or more mechanisms for vector processing (i.e., vector execution units).

Mass-storage device 110, memory 108, L2 cache 106, and L1 cache 104 are computer-readable storage devices that collectively form a memory hierarchy that stores data and instructions for processor 102. Generally, mass-storage device 110 is a high-capacity, non-volatile memory, such as a disk drive or a large flash memory, with a large access time, while L1 cache 104, L2 cache 106, and memory 108 are smaller, faster semiconductor memories that store copies of frequently used data. Memory 108 is typically a dynamic random access memory (DRAM) structure that is larger than L1 cache 104 and L2 cache 106, whereas L1 cache 104 and L2 cache 106 are typically comprised of smaller static random access memories (SRAM). In some embodiments, L2 cache 106, memory 108, and mass-storage device 110 are shared between one or more processors in computer system 100. Such memory structures are well-known in the art and are therefore not described in more detail.

In some embodiments, the devices in the memory hierarchy (i.e., L1 cache 104, etc.) can access (i.e., read and/or write) multiple cache lines per cycle. These embodiments enable more effective processing of memory accesses that occur based on a vector of pointers or array indices to non-contiguous memory addresses. In addition, in some embodiments, the caches in the memory hierarchy are divided into a number of separate banks, each of which can be accessed in parallel. Banks within caches and parallel accesses of the banks are known in the art and hence are not described in more detail.

Computer system 100 can be incorporated into many different types of electronic devices. For example, computer system 100 can be part of a desktop computer, a laptop computer, a server, a media player, an appliance, a cellular phone, a piece of testing equipment, a network appliance, a personal digital assistant (PDA), a hybrid device (i.e., a "smart phone"), or another electronic device.

Figure 2:
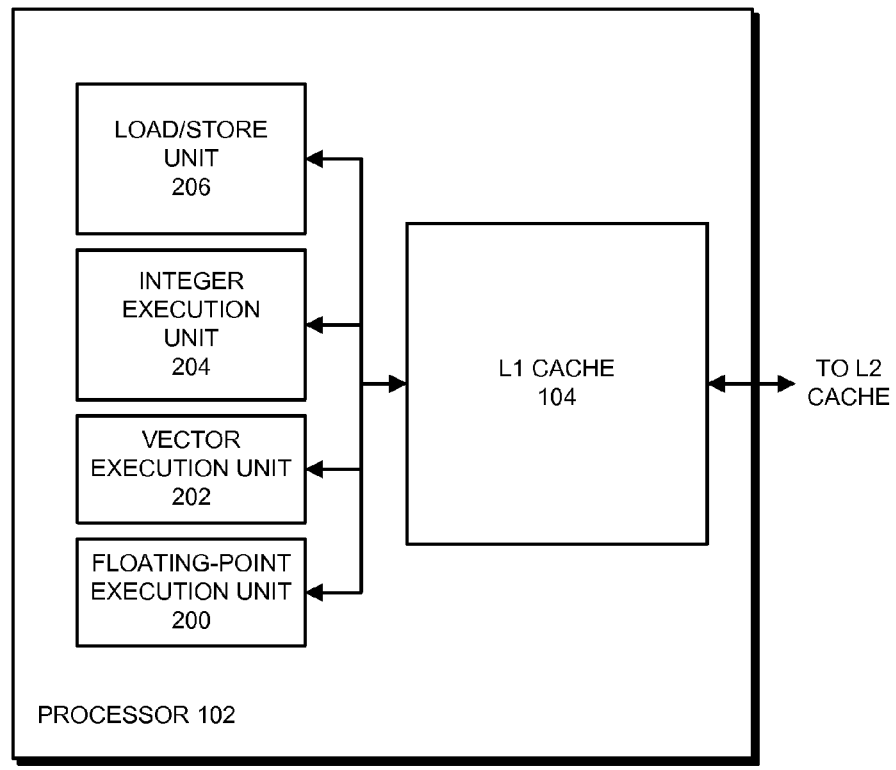
FIG. 2 presents an expanded view of a processor in accordance with the described embodiments.

Although we use specific components to describe computer system 100, in alternative embodiments, different components may be present in computer system 100. For example, computer system 100 may not include some of the memory hierarchy (e.g., memory 108 and/or mass-storage device 110). Alternatively, computer system 100 may include video cards, video-capture devices, user-interface devices, network cards, optical drives, and/or other peripheral devices that are coupled to processor 102 using a bus, a network, or another suitable communication channel. Computer system 100 may also include one or more additional processors, wherein the processors share some or all of L2 cache 106, memory 108, and mass-storage device 110.
Processor FIG. 2 presents an expanded view of processor 102 in accordance with the described embodiments. As is shown in FIG. 2, processor 102 includes L1 cache 104, floating-point execution unit 200, integer execution unit 204, vector execution unit 202, and load/store unit 206 (floating-point execution unit 200, integer execution unit 204, vector execution unit 202, and load/store unit 206 as a group are interchangeably referred to as "the execution units").

Each of execution units 200-206 is used for performing computational operations, such as logical operations, mathematical operations, bitwise operations, or memory access operations for an associated type of operand. More specifically, integer execution unit 204 is used for performing computational operations that involve integer operands, floating-point execution unit 200 is used for performing computational operations that involve floating-point operands, vector execution unit 202 is used for performing computational operations that involve vector operands, and load/store unit 206 is used for performing vector and scalar memory accesses. Integer execution units and floating-point execution units are generally known in the art and are not described in more detail.

Figure 3:
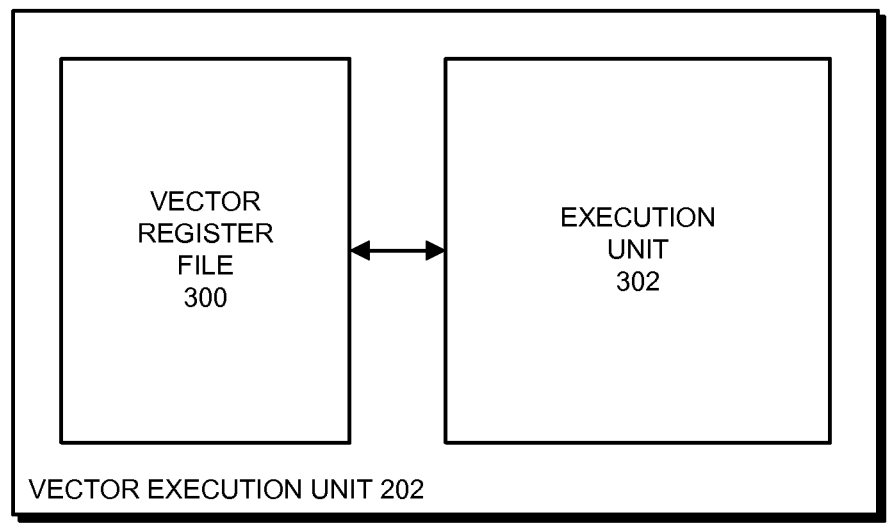
FIG. 3 presents an expanded view of a vector execution unit in accordance with the described embodiments.

In the described embodiments, vector execution unit 202 is a single-instruction-multiple-data (SIMD) execution unit that performs operations in parallel on some or all of the data elements that are included in vectors of operands. FIG. 3 presents an expanded view of vector execution unit 202 in accordance with the described embodiments. As is shown in FIG. 3, vector execution unit 202 includes a vector register file 300 and an execution unit 302. Vector register file 300 includes a set of vector registers that can hold operand vectors and result vectors for execution unit 302. In some embodiments, there are 32 vector registers in the vector register file, and each register includes 128 bits. In alternative embodiments, there are different numbers of vector registers and/or different numbers of bits per register.

Vector execution unit 202 retrieves operands from registers in vector register file 300 and executes vector instructions that cause vector execution unit 202 to perform operations in parallel on some or all of the data elements (or, simply, "elements") in the operand vector. For example, vector execution unit 202 can perform logical operations, mathematical operations, or bitwise operations on the elements in the vector. Vector execution unit 202 can perform one vector operation per cycle (although the "cycle" may include more than one cycle of a clock used to trigger, synchronize, and/or control execution unit 302's computational operations).

In the described embodiments, execution unit 302 supports vectors that hold N data elements (e.g., bytes, words, double-words, etc.). In these embodiments, execution unit 302 can perform operations on Nor fewer of the data elements in an operand vector in parallel. For example, assuming an embodiment where the vector is 256 bits in length (i.e., 32 bytes), the data elements being operated on are four-byte words, and the operation is adding a value to the data elements, these embodiments can add the value to any number of the eight words in the vector.

In the described embodiments, execution unit 302 includes at least one control signal that enables the dynamic limitation of the data elements in an operand vector on which execution unit 302 operates. Specifically, depending on the state of the control signal, execution unit 302 may or may not operate on all the data elements in the vector. For example, assuming an embodiment where the vector is 512 bits in length and the data elements being operated on are four-byte words, the control signal can be asserted to prevent operations from being performed on some or all of 16 data words in the operand vector. Note that "dynamically" limiting the data elements in the operand vector upon which operations are performed can involve asserting the control signal separately for each cycle at runtime.

In some embodiments, based on the values contained in a vector of predicates or one or more scalar predicates, execution unit 302 applies vector operations to selected vector data elements only. In some embodiments, the remaining data elements in a result vector remain unaffected (which we call "predication") or are forced to zero (which we call "zeroing"). In some of these embodiments, the clocks for the data element processing subsystems ("lanes") that are unused due to predication or zeroing in execution unit 302 can be gated, thereby reducing dynamic power consumption in execution unit 302.

The described embodiments are vector-length agnostic. Thus, a compiler or programmer need not have explicit knowledge of the vector length supported by the underlying hardware (e.g., vector execution unit 302). In these embodiments, a compiler generates or a programmer writes program code that need not rely on (or use) a specific vector length (some embodiments are forbidden from even specifying a specific vector size in program code). Thus, the compiled code in these embodiments (i.e., binary code) runs on other embodiments with differing vector lengths, while potentially realizing performance gains from processors that support longer vectors. Consequently, as process technology allows longer vectors, execution of legacy binary code simply speeds up without any effort by software developers.

In some embodiments, vector lengths need not be powers of two. Specifically, vectors of 3, 7, or another number of data elements can be used in the same way as vectors with power-of-two numbers of data elements.

In the described embodiments, each data element in the vector can contain an address that is used by execution unit 302 for performing a set of memory accesses in parallel. In these embodiments, if one or more elements of the vector contain invalid memory addresses, invalid memory-read operations can occur. In these embodiments, invalid memory-read operations that would otherwise result in program termination instead cause any elements with valid addresses to be read and elements with invalid elements to be flagged, allowing program execution to continue in the face of speculative, and in hindsight illegal, read operations.

In some embodiments, processor 102 (and hence execution unit 302) is able to operate on and use vectors of pointers. In these embodiments, the number of data elements per vector is the same as the number of pointers per vector, regardless of the size of the data type. Instructions that operate on memory may have variants that indicate the size of the memory access, but elements in processor registers should be the same as the pointer size. In these embodiments, processors that support both 32-bit and 64-bit addressing modes may choose to allow twice as many elements per vector in 32-bit mode, thereby achieving greater throughput. This implies a distinct throughput advantage to 32-bit addressing, assuming the same width data path. Implementation-specific techniques can be used to relax the requirement. For example, double-precision floating-point numbers can be supported in 32-bit mode through register pairing or some other specialized mechanism.

Figure 4:
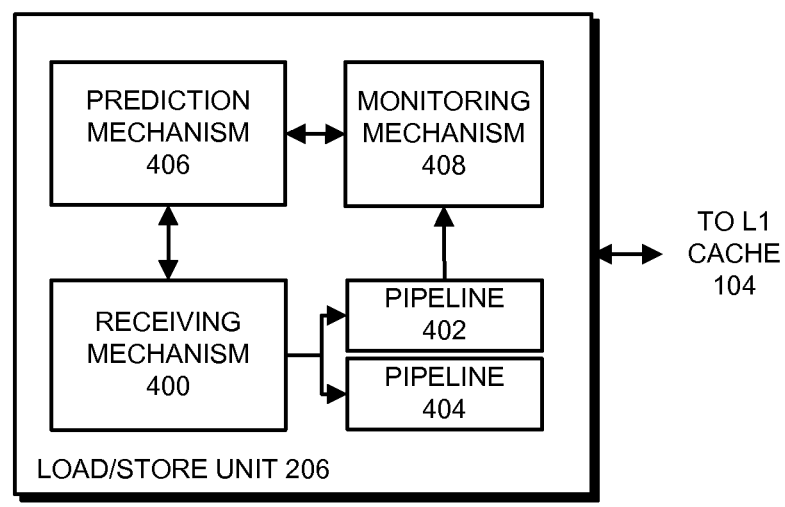
FIG. 4 presents a block diagram of a load/store unit in accordance with some embodiments.

FIG. 4 presents a block diagram of load/store unit 206 in accordance with the described embodiments. As can be seen in FIG. 4, load/store unit 206 includes receiving mechanism 400, pipelines 402-404, prediction mechanism 406, and monitoring mechanism 408. Generally, load/store unit 206 executes memory-accessing instructions (e.g., VectorRead, VectorReadFF, VectorReadNF, VectorWrite, etc.) to perform the corresponding memory operations.

Within load/store unit 206, pipelines 402-404 are two execution pipelines for executing memory-accessing instructions. In some embodiments, the pipelines differ in the types of memory operations that are executed in the pipelines. For example, in some embodiments, pipeline 402 performs wide memory accesses optimized for multiple sequentially-addressed elements, whereas pipeline 404 performs memory operations corresponding to individual elements or scalar operations. Receiving mechanism 400 receives decoded vector memory-accessing instructions dispatched from a dispatch unit (not shown), determines which pipeline 402-404 is best suited for executing the corresponding memory operations, and forwards each memory-accessing instruction to the determined pipeline, where it is executed to perform the corresponding memory operation(s).

In addition to the mechanisms for executing memory-accessing instructions, load/store unit 206 includes prediction mechanism 406. Generally, given a memory-accessing instruction, prediction mechanism 406 can predict if the addresses in active elements of the memory-accessing instruction are likely to be arranged in a predetermined pattern. If so, prediction mechanism 406 can cause load/store unit 206 to perform a "fast" version of the memory operation for the memory-accessing instruction that is optimized for the nature of the predicted pattern. Otherwise, if the addresses cannot be predicted (i.e., if the addresses are unlikely to be in a predetermined pattern), prediction mechanism 406 can cause load/store unit 206 to perform a "normal" version of the memory operation for the memory-accessing instruction. In some cases, the fast version of the memory operation generates fewer sub-operations (address translations, etc.) than the normal memory operation. However, in some cases, the fast version of the memory operation includes the same number of memory operations, but the memory operations are arranged to execute more efficiently (e.g., using multiple simultaneous memory accesses, etc.). The fast version of the memory operation typically executes in less time than the normal version of the memory operation.

Load/store unit 206 also includes monitoring mechanism 408, which includes mechanisms for monitoring the execution of memory operations based on the prediction, determining if the prediction was correct, performing remedial actions if the prediction was incorrect, and keeping one or more records regarding the outcome of the prediction that can be used in making subsequent predictions.

Note that, although we show prediction mechanism 406 and monitoring mechanism 408 separate mechanisms, in some embodiments, some or all of the mechanisms are arranged differently. For example, some or all of monitoring mechanism 408 can be included in a different unit in processor 102, or the two mechanisms could be merged. Additionally, although we describe two pipelines as an illustrative embodiment, in some embodiments, there are more pipelines. In these embodiments, each pipeline can be configured to perform a given type of memory-accessing instructions.

Although we describe processor 102 as including a particular set of units, in alternative embodiments, processor 102 can include different numbers or types of units. Moreover, although the embodiment shown in FIG. 2 is limited to a particular set of functional blocks, in the described embodiments, processor 102 can include other functional blocks, such as an instruction fetch unit, a dispatch unit, a branch unit, I/O interfaces, etc. The additional functional blocks that can be present in processor 102 are known in the art and are not described in more detail.

Predicting a Pattern in the Addresses for Memory-Accessing Instructions

As described above, in Macroscalar processors (i.e., in processors based on the Macroscalar architecture), iterations of loops can be executed in parallel using corresponding elements of vector instructions. For example, in these processors, memory accesses within a loop can be performed using the corresponding elements of a vector memory-accessing instruction. One example of such a memory-accessing instruction is the VectorRead instruction (or a variant thereof), which can be used to perform read operations for a loop, and another example is the VectorWrite (or a variant thereof), which can be used to perform write operations for a loop.

Generally, in Macroscalar processors, when executing a vector memory-accessing instruction, multiple sub-operations must be performed for each active element of the memory-accessing instruction. More specifically, when a vector memory-accessing instruction is executed, an address for each active element of the memory-accessing instruction is computed. The computed address for each active element is then translated from a virtual address to physical address. Next, the physical address for each active element is used to perform a look-up in L1 cache 104. If the cache line is present in L1 cache 104, the corresponding memory access is performed. However, a cache miss entails further operations for performing the memory access, e.g., forwarding a request to L2 cache 106, etc. Because each of the sub-operations takes time and requires processor resources to complete, the processor can sometimes experience delay when executing vector memory-accessing instructions.

In some cases, a vector memory-accessing instruction in a loop almost always includes addresses that are arranged in the same pattern. As some examples, the pattern can be that the addresses are: (1) the same address; (2) sequential addresses; (3) addresses within the same cache line; (4) addresses within a same page of memory; (5) addresses within different cache banks that can be accessed simultaneously. However, prior Macroscalar processors were required to perform each of the above-described memory access sub-operations for each active element in memory access instructions regardless of the pattern in which the addresses were arranged.

To avoid some of the delay incurred in executing vector memory-accessing instructions, the described embodiments can predict the a pattern in the addresses for the active elements of vector memory-accessing instructions and use the predicted pattern in the addresses to perform "fast" versions of the corresponding memory operations. More specifically, in these embodiments, prediction mechanism 406 can determine when the addresses for the active elements of a vector memory-accessing instruction can be predicted to be arranged in a predetermined pattern. Based on the predicted pattern of the addresses, prediction mechanism 406 can cause load/store unit 206 to reconfigure the memory operation to be performed from a "normal" version of the memory operation to the fast version of the memory operation. In these embodiments, the fast version of the memory operation is optimized for the nature of the predicted pattern.

Generally, a fast version of the memory operation requires less sub-operations (translations, lookups, etc.) and/or performs sub-operations that complete more quickly than the normal version of the memory operation, thereby enabling the load/store unit 206 to complete execute the memory-access instruction more quickly. As one example, assume an eight element VectorReadInt instruction for which the addresses are sequential and for which all elements are active. In other words, the addresses that are computed for the elements of the VectorReadInt instruction start with a first address in a leftmost element, and then increase by one integer address for each element from left to right in the elements of the VectorReadInt instruction. In this case, the normal version of the memory operation causes the load/store unit 206 to generate eight separate sets of sub-operations (address translations, lookups, etc.) to perform the eight read operations. However, in the described embodiments, based on the fact that all of the addresses are sequential, a fast version of the memory operation can include loading the data from all the addresses with a single operation, and then distributing the loaded data to the memory-accessing instruction. Thus, in the fast version of the memory operation, there may be only one translation (of the leftmost address) and one lookup operation (to access all the addresses). In these embodiments, the fast version of the memory operation can be directed by receiving mechanism 400 to pipeline 402, which performs wide memory accesses optimized for multiple sequentially-addressed elements.

As another example, assume an eight element VectorReadInt instruction for which the addresses are located in the same page of memory and for which all elements are active. In this case, the normal version of the memory operation causes the load/store unit 206 to generate eight separate sets of sub-operations (address translations, lookups, etc.) to perform the eight read operations. However, in the described embodiments, based on the fact that all of the addresses are located in the same page of memory, a fast version of the memory operation can include performing only one translation (of one of the addresses in the memory-accessing instruction). This is true because virtual-to-physical address translation (i.e., a page-table lookup) does not change bits 0-11 of the address. Thus, if all addresses are in the same page, the translation only looks up the upper bits of that page, and applies the upper bits to all of the addresses in that page. In these embodiments, the fast version of the memory operation may be directed by receiving mechanism 400 to the pipeline 402, which performs wide memory accesses optimized for multiple sequentially-addressed elements (which depends on the predicted pattern in the addresses), but could also be directed to pipeline 404 performs memory operations corresponding to individual elements.

Note that although we present examples where a fast version of a memory operation is generated, there are other cases where a fast version of a memory operation can be generated. For example, when the addresses in the active elements of a memory-accessing instruction are the same address; in the same cache line; or addresses within different cache banks that can be accessed simultaneously, a fast version of the memory operation can be generated. Generally, a fast version of a memory operation can be generated any time that load/store unit 206 can use some pattern in the addresses of a memory-access instruction to generate fewer sub-operations for fulfilling the memory operation than a normal version of the same memory operation, or can use some pattern in the addresses of a memory-access instruction to generate sub-operations that execute more quickly (e.g., parallel accesses of memory structures, etc.).

Figure 5:
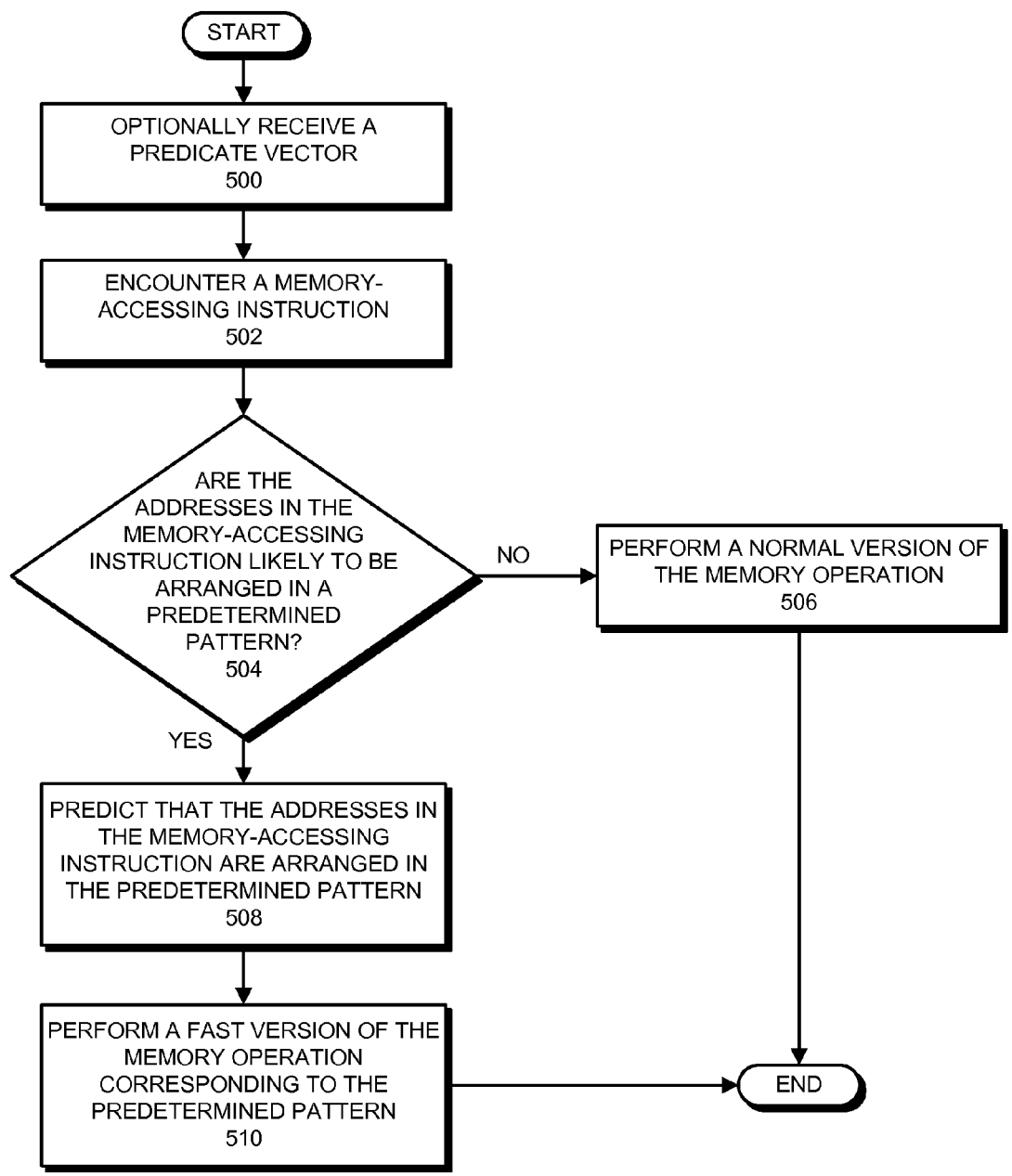
FIG. 5 presents a flowchart illustrating a process for predicting a pattern in addresses for a memory-accessing instruction in accordance with the described embodiments.

Process for Predicting a Pattern in the Addresses for Memory-Accessing Instructions FIG. 5 presents a flowchart illustrating a process for predicting a pattern in the addresses for a memory-accessing instruction in accordance with the described embodiments.

The process shown in FIG. 5 starts when processor 102 optionally receives a predicate vector (step 500). Recall that processor 102 (and load/store unit 206) uses active elements of the predicate vector to determine the elements of a memory-accessing instruction (see step 502) for which memory access operations are performed. However, if processor 102 does not receive a predicate vector, processor 102 assumes a predicate vector for which all elements are active, and performs the following operations for each element of the memory-accessing instruction.

Prediction mechanism 406 then encounters a memory-accessing instruction (step 502). In the embodiments described with respect to FIG. 5, prediction mechanism 406 encounters the memory-accessing instruction while monitoring instructions that are received by receiving mechanism 400. In these embodiments, prediction mechanism 406 can monitor the instructions for a VectorRead, VectorReadFF, VectorReadNF, and VectorWrite or another instruction that performs a memory operation for a set of elements in the memory-accessing instruction.

Next, prediction mechanism 406 determines if the addresses in the elements of the memory-accessing instruction are likely to be arranged in a predetermined pattern (step 504). In making the determination, prediction mechanism 406 can determine, for example, whether it is likely that the addresses in the elements are: the same address; sequential addresses; addresses in a same cache line; addresses in a same page of memory; addresses belonging to two or more different cache banks that can be accessed in parallel; or are arranged in another identifiable pattern. Generally, any pattern that load/store unit 206 can use to generate a fast version of the memory operation can be used as a predetermined pattern.

In some embodiments, prediction mechanism 406 can use one or more factors when making the determination if the addresses are arranged in the predetermined pattern. Generally, any factor that can be used to characterize the memory-accessing instruction (e.g., the type, address, inputs, outputs, etc. of the memory-accessing instruction), the history of instruction execution (i.e., the memory-accessing instruction itself and/or other instructions), the past or current state of processor 102, etc. can be used in predicting the result vector of the memory-accessing instruction. As examples, prediction mechanism 406 can make the prediction based on one or more of the following factors: (1) a record in processor 102 indicates that the addresses in the elements of the memory-accessing instruction were arranged in the predetermined pattern when the memory-accessing instruction was executed one or more previous times; (2) a table lookup computed from an address of the memory-accessing instruction returns a confirmation that the addresses in the elements of the memory-accessing instruction are likely arranged in the predetermined pattern; (3) an address of a predetermined element of the memory-accessing instruction indicates that the memory-accessing instruction is likely have addresses arranged in the predetermined pattern; (4) one or more processor tracking mechanisms are set to indicate that the memory-accessing instruction is likely have addresses arranged in the predetermined pattern; (5) a computation made by a prediction computation mechanism (e.g., a fuzzy logic, processor, neural network, etc.) in prediction mechanism 406 indicates that the memory-accessing instruction is likely have addresses arranged in the predetermined pattern; (6) the variant of the memory-accessing instruction being predicted indicates that the memory-accessing instruction is likely have addresses arranged in the predetermined pattern; (7) the addresses of one or more prior instructions of a given type that preceded the memory-accessing instruction indicate that the memory-accessing instruction is likely have addresses arranged in the predetermined pattern; (8) one or more factors related to executing instructions prior to the memory-accessing instruction (a code-path history) indicate that the memory-accessing instruction is likely have addresses arranged in the predetermined pattern; (9) a pattern of taken or not-taken branches for a number of branches that preceded the memory-accessing instruction that is being predicted indicates that the memory-accessing instruction is likely have addresses arranged in the predetermined pattern; (10) a value of counter indicating the number of occurrences of an event (e.g., a prior prediction) indicates that the memory-accessing instruction is likely have addresses arranged in the predetermined pattern; or (11) a value of a variable representing a prediction accuracy associated with the memory-accessing instruction indicates that the memory-accessing instruction is likely have addresses arranged in the predetermined pattern. In these embodiments, prediction mechanism 406 can store a value that represents each factor to be used in making a decision and then can perform one or more mathematical, logical, combinatory, comparison, or algorithmic operations using the values to make the determination.

In addition, when making the determination whether the memory-accessing instruction is likely have addresses arranged in the predetermined pattern, prediction mechanism 406 can determine that all memory-accessing instructions are to be predicted in the same way. That is, predict that all memory-accessing instructions are likely have addresses arranged in a specified predetermined pattern. In some embodiments, the prediction can be made without considering any of the above-described factors, i.e., can be automatic.

In the described embodiments, prediction mechanism 406 can include one or more variables, memory locations, registers, lookup tables, status flags/indicators, functional blocks, or other mechanisms or circuit structures that are used to hold values representing the factors to enable prediction mechanism 406 to determine if the memory-accessing instruction is likely have addresses arranged in the predetermined pattern. Prediction mechanism 406 can use these mechanisms to maintain records of the one or more factors that are used in making the determination. Prediction mechanism 406 and/or processor 102 can additionally compute values to be used by prediction mechanism 406 for making the determination. These values can be computed at the time that the determination is to be made or can be automatically computed whenever a relevant event occurs and stored in one or more of the mechanisms in prediction mechanism 406.

In these embodiments, if prediction mechanism 406 cannot determine that the memory-accessing instruction is likely have addresses arranged in the predetermined pattern (step 504), prediction mechanism 406 does not predict that there is a pattern in the addresses for the memory-accessing instruction. For example, prediction mechanism 406 can determine that the pattern in the addresses cannot be predicted if it is not sufficiently clear that there will be a pattern the addresses the active elements of the memory-accessing instruction based on the one or more factors used in making the determination. In this case, the memory-accessing instruction is executed by performing a normal version of the memory operation (step 506). Note that performing the normal version of the memory operation includes determining a physical address for each active element of the memory-accessing instruction and, for each active element of the memory-accessing instruction, generating a separate memory operation to access memory using the corresponding physical address (i.e., performing a memory operation for each active element in the memory-accessing instruction).

If the memory-accessing instruction is likely have addresses arranged in the predetermined pattern (step 504), prediction mechanism 406 predicts that the addresses in the elements are arranged in the predetermined pattern (step 508). Load/store unit 206 then performs a fast version of the memory operation optimized for the predetermined pattern (step 510). More specifically, in some embodiments, when performing the fast version of the memory operation, load/ store unit 206 generates a memory operation corresponding to the pattern of addresses that prediction mechanism 406 predicted. In these embodiments, the fast version of the memory operation includes fewer sub-operations in comparison to the normal version of the memory operation and/or a set of sub-operations that executes more quickly than the sub-operations in the normal version of the memory operation.

In some embodiments, when generating the fast version of the memory operation, load/store unit 206 first determines at least one physical address for an address in at least one specified element of the memory-accessing instruction, wherein the at least one specified element is determined according to the predetermined pattern. In other words, based on the predetermined pattern, load/store unit 206 acquires one or more key addresses (or data that is used to compute the key addresses) from, e.g., the leftmost element of the memory-accessing instruction, the rightmost element, the center element, or any element or combination of elements. Load/store unit 206 next requests a translation of the key address(es) from a virtual address to a physical address from a translation-lookaside buffer (TLB). Load/store unit 206 then determines the size and/or location of at least one portion of memory to be accessed based on the predetermined pattern. For example, if the predetermined pattern indicates that all the accesses are within a cache line, load/store unit 206 can determine that the size is a cache line, and the location is the location of the cache line. As another example, load/store unit 206 can determine that the size is two or more cache lines and the locations are two or more corresponding banks of a cache memory. Finally, load/store unit 206 generates at least one memory operation to access the at least one portion of memory using the at least one physical address.

In some embodiments, generating the fast version of the memory operation includes determining a pipeline 402-404 that is best suited for performing the memory operation and forwarding the memory operation to the determined pipeline.

Verification of Prediction

When using the predicted pattern in the addresses to execute the vector memory-accessing instruction, monitoring mechanism 408 records that the execution is speculative. Load/store unit 206 also proceeds with a resolution of the actual addresses for the vector memory-accessing instruction (i.e., the memory-accessing instruction for which the addresses were predicted). When the actual addresses have been resolved, monitoring mechanism 408 determines if the actual addresses conform to the predicted pattern in the addresses. If the actual addresses do not conform to the predicted pattern, load/store unit 206 can discard (or ignore) the results from the fast version of the memory operation and perform a normal version of the memory operation using the actual addresses.

Making Predictions based on Prediction Accuracy

In some embodiments, prediction mechanism 406 and/or monitoring mechanism 408 includes a mechanism for tracking prediction accuracy for corresponding memory-accessing instructions. In these embodiments, the prediction accuracy can be kept as a value that represents a portion of the predictions that turned out to be correct and/or incorrect. For example, the prediction accuracy can be kept as a percentage of all the predictions made that proved to be correct. The prediction accuracy can be used as one of the factors in determining whether a memory-accessing instruction can be predicted. For example, if the prediction accuracy is below a threshold value (e.g., X % correct, last M predictions correct, etc.), prediction mechanism 406 may not make the prediction (or may only make the prediction if one or more of the other factors strongly indicates that the memory-accessing instruction is predictable).

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for executing a vector instruction in a processor, comprising:
    encountering a vector memory-accessing instruction that performs a memory operation for a set of elements in the memory-accessing instruction;
    for each active element in the memory-accessing instruction, upon determining that addresses in the elements are likely to be arranged in a predetermined pattern of addresses, predicting that the addresses in the elements are arranged in the predetermined pattern;
    determining at least one specified element of the memory-accessing instruction based on the predetermined pattern;
    generating a first version of the memory operation based on the predetermined pattern, the generating comprising performing an address translation for a single address from the at least one specified element to determine a single physical address and using the single physical address and the predetermined pattern to determine one or more other addresses for the first version of the memory operation; and
    performing the first version of the memory operation in a first pipeline of a load/store unit in the processor, the first pipeline configured to access multiple vector elements in parallel, and wherein the load/store unit further includes a second pipeline to perform a second version of the memory operation when the memory operation is not predicted to be arranged in the predetermined pattern, wherein the second pipeline is configured to access each vector element separately.

2. The method of claim 1, wherein the addresses in the elements are arranged in the predetermined pattern when the addresses are one of:
    the same address;
    addresses in a same cache line;
    addresses in a same page of memory; or
    addresses belonging to two or more different cache banks that can be accessed in parallel.

3. The method of claim 1, wherein the first version of the memory operation comprises at least one of:
    a reduced number of sub-operations in comparison to the second version of the memory operation, or
    sub-operations that can be executed more quickly than the sub-operations in the second version of the memory operation.

4. The method of claim 1, wherein generating the first version of the memory operation comprises:
    determining at least one of a size or location of at least one portion of memory to be accessed based on the predetermined pattern; and
    generating at least one memory operation to access the at least one portion of memory using the single physical address.

5. The method of claim 4, wherein the portion of memory comprises at least one cache line.

6. The method of claim 1, wherein generating the first version of the memory operation comprises:
   determining a page of memory in which the single physical address is located; and
   generating at least one memory operation to access a page of memory using the single physical address.

7. The method of claim 1, wherein the method further comprises:
   upon determining that addresses in the elements are not likely to be arranged in a predetermined pattern, performing the second version of the memory operation in the second pipeline.

8. The method of claim 7, wherein performing the second version of the memory operation comprises:
   for each active element in the memory-accessing instruction:
      determining a physical address for the element of the memory-accessing instruction; and
      generating a memory operation to access memory using the corresponding physical address.

9. The method of claim 1, wherein the memory operation is one of a load operation or a store operation.

10. The method of claim 1, wherein the method further comprises:
    for each active element in the memory-accessing instruction:
       determining an actual address for the element of the memory-accessing instruction;
       determining if the actual addresses in the memory-accessing instruction conform to the predicted predetermined pattern of addresses; and
       if not, performing a remedial action, otherwise, continuing subsequent execution.

11. The method of claim 1, wherein the method further comprises:
    using one or more factors to determine if the addresses in the elements are likely to be arranged in the predetermined pattern.

12. The method of claim 1, wherein the memory-accessing instruction is a VectorRead instruction, a VectorReadFF instruction, a VectorReadNF instruction, or a VectorWrite instruction.

13. A processor that executes vector instructions, comprising:
    a load/store unit including a first pipeline configured to perform a first version of a memory operation and a second pipeline configured to perform a second version of the memory operation, wherein the first pipeline is configured to access multiple vector elements in parallel and the second pipeline is configured to access each vector element separately, wherein the load/store unit is configured to:
       encounter a vector memory-accessing instruction that performs the memory operation for a set of elements in the memory-accessing instruction; and
       for each active element in the memory-accessing instruction, upon determining that addresses in the elements are likely to be arranged in a predetermined pattern of addresses:
          predict that the addresses in the elements are arranged in the predetermined pattern;
          determine at least one specified element of the memory accessing instruction based on the predetermined pattern;
          generate the first version of the memory operation based on the predetermined pattern, the generating comprising performing an address translation for a single address from the at least one specified element to determine a single physical address and using the single physical address and the predetermined pattern to determine one or more other addresses for the first version of the memory operation; and
          perform the first version of the memory operation in the first pipeline.

14. The processor of claim 13, wherein the addresses in the elements are arranged in the predetermined pattern when the addresses are one of:
    the same address;
    addresses in a same cache line;
    addresses in a same page of memory; or
    addresses belonging to two or more different cache banks that can be accessed in parallel.

15. The processor of claim 13, wherein the first version of the memory operation comprises at least one of a reduced number of sub-operations in comparison to the second version of the memory operation or sub-operations that can be executed more quickly than the sub-operations in the second version of the memory operation.

16. The processor of claim 13, wherein when generating the first version of the memory operation, the processor is configured to:
    determine at least one of a size or location at least one portion of memory to be accessed based on the predetermined pattern; and
    generate at least one memory operation to access the at least one portion of memory using the single physical address.

17. The processor of claim 16, wherein the portion of memory comprises at least one cache line.

18. The processor of claim 13, wherein when generating the first version of the memory operation, the processor is configured to:
    determine a page of memory in which the at least one address is located; and
    generate at least one memory operation to access a page of memory using the single physical address.

19. The processor of claim 13, wherein, upon determining that addresses in the elements are not likely to be arranged in a predetermined pattern, the processor is configured to perform the second version of the memory operation in the second pipeline.

20. The processor of claim 19, wherein when performing the second version of the memory operation, for each active element in the memory-accessing instruction, the processor is configured to:
    determine a physical address for the element of the memory-accessing instruction; and
    generate a memory operation to access memory using the corresponding physical address in the second pipeline.

21. The processor of claim 13, wherein the memory operation is one of a load operation or a store operation.

22. The processor of claim 13, wherein, for each active element in the memory-accessing instruction, the processor is configured to:
    determine an actual address for the element of the memory-accessing instruction;
    determine if the actual addresses in the memory-accessing instruction conform to the predicted predetermined pattern of addresses; and
    if not, perform a remedial action, otherwise, continue subsequent execution.

23. The processor of claim 13, wherein the processor is configured to use one or more factors to determine if the addresses in the elements are likely to be arranged in the predetermined pattern.

24. The processor of claim 13, wherein the memory-accessing instruction is a VectorRead instruction, a VectorReadFF instruction, a VectorReadNF instruction, or a VectorWrite instruction.

25. A computer system that executes vector instructions, comprising:

a memory that stores instructions and data for a processor; and the processor coupled to the memory, the processor including:

a load/store unit including a first pipeline configured to perform a first version of a memory operation and a second pipeline configured to perform a second version of the memory operation, wherein the first pipeline is configured to access multiple vector elements in parallel and the second pipeline is configured to access each vector element separately, wherein the load/store unit is configured to:

encounter a vector memory-accessing instruction that performs the memory operation for a set of elements in the memory-accessing instruction; and for each active element in the memory-accessing instruction, upon determining that addresses in the elements are likely to be arranged in a predetermined pattern of addresses:

predict that the addresses in the elements are arranged in the predetermined pattern;

determine at least one specified element of the memory accessing instruction based on the predetermined pattern;

generate the first version of the memory operation based on the predetermined pattern, the generating comprising performing an address translation for a single address from the at least one specified element to determine a single physical address and using the single physical address and the predetermined pattern to determine one or more other addresses for the first version of the memory operation; and perform the first version of the memory operation in the first pipeline.

* * * * *